Oct. 25, 1955
O. D. JORDAN
2,721,948
AUTOMATIC VOLTAGE AND ELECTRODE CONTROL
FOR ELECTRIC-ARC FURNACES
Filed Feb. 10, 1953
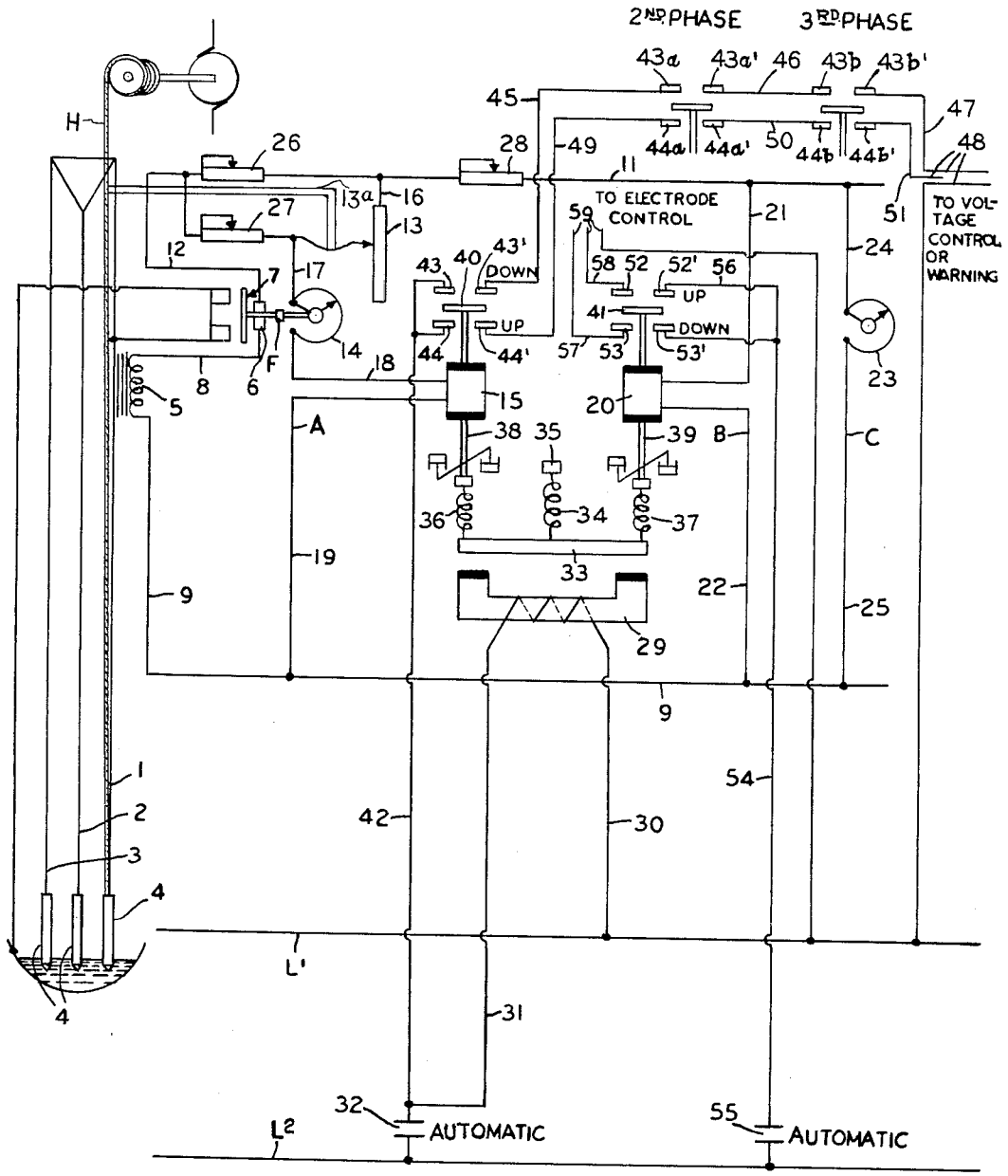
INVENTOR.
*Otis D. Jordan*
BY
*Frease & Bishop*
ATTORNEYS

United States Patent Office 2,721,948
Patented Oct. 25, 1955

2,721,948

AUTOMATIC VOLTAGE AND ELECTRODE CONTROL FOR ELECTRIC-ARC FURNACES

Otis D. Jordan, Zanesville, Ohio, assignor to Ohio Ferro-Alloys Corporation, Canton, Ohio, a corporation of Ohio Application February 10, 1953, Serial No. 336,123

8 Claims. (Cl. 314—73)

The invention relates to improvements in automatic regulators for controlling the rate of energy consumed in electric-arc furnaces, and more particularly to such automatic regulators for the submerged-arc type of electric-arc furnace, wherein the automatic regulator fills a specific and heretofore unfulfilled need.

The term "direct-arc furnace" as used in this description, refers to an electric-arc furnace wherein the carbon or graphite electrodes carrying energy to the charge within the furnace do not ordinarily penetrate the charge, but deliver energy to the charge by way of an open arc between the electrode, or electrodes and the charge. This type of furnace is commonly used for the melting and refining of steel and may be broadly defined as an electric furnace wherein the arc occurs only between the electrodes and the surfaces of the charge being melted or refined.

The term "submerged-type furnace" refers to an electric-arc furnace wherein the electrodes penetrate the charge, and energy is delivered to the charge by way of multiple arcs between the surfaces of the electrodes and the charge and/or the heat arising from current flowing through the charge from one electrode to another. This type of furnace is commonly used for the electric furnace reduction of chromium, manganese and silicon from their respective ores, as well as for the production of calcium carbides and other carbides.

In direct-arc furnaces, it is common practice to regulate the load on the furnace by positioning the electrodes just above the charge, so that when very heavy loads are desired the electrode is very close to the charge, resulting in heavy currents in the arc; and so that when less heavy loads are desired, the electrode can be moved further from the charge resulting in diminished current in the arc.

Since, in most cases, the charge or molten bath offers very little resistance to the flow of electric current, the heat generated is a function of the current and the resistance of the arc; and the voltage between any electrode and the molten bath is inversely related to the current flowing between that electrode and the bath. Also, because of the low resistance of the bath, the voltage appearing between any electrode and the bath is substantially the same as the voltage appearing between the same electrode and the furnace shell at the same time.

Automatic regulators for direct-arc furnaces have usually been such that upon an increase of current in the arc (hence in the electrode and other circuit components of that phase), the regulator acts to move the electrode further from the charge, thus diminishing the current and re-establishing the desired current in the arc as determined by the settings of the adjustments of the regulator.

Conversely, upon a decrease of current in any electrode, that electrode is automatically moved closer to the charge, resulting in an increase of current in that phase. To accomplish this, automatic regulators for direct-arc furnaces commonly react to a current component directly related to the current in the phase being regulated; and to a voltage component directly related to the voltage appearing between the electrode being regulated and the furnace shell. Since these two values always change in an opposite manner, one from the other, the regulator can translate changes in voltage and current into necessary changes in the position of the electrode.

This is commonly done by causing both the current and voltage components to act on relays having a common, balanced armature; or by exciting opposing fields of a generator with the rectified direct-current result of the current and voltage components and using the output of the generator to move a motor which is coupled to the electrode positioning mechanism of the phase being thus controlled.

Regulators designed for direct-arc furnaces—namely those that move the electrode in response to simultaneous changes in electrode current and electrode-to-shell voltage—do not work effectively on the submerged-arc furnace. In the submerged-arc furnace, these two electrical values are not always inversely coincident; nor do they always exactly indicate the optimum action to be taken by the regulator to insure best operating conditions of the furnace.

Whereas, in the direct-arc furnace, the electrodes do not penetrate the charge; in the submerged-arc furnace, the electrodes always penetrate the charge to a greater or lesser degree, and the optimum operating condition is the maximum electrode penetration coinciding with the highest possible voltage between the electrodes. Hence, the regulator for the submerged-arc furnace should operate in such a manner as to maintain the desired current in the electrode, the desired penetration of the charge by the electrode, and the highest possible transformer voltage that will permit the first two conditions. At any time when conditions within the furnace charge are such as to prevent simultaneous achievement of all desired characteristics, the regulator should act to bring about the best possible compromise among these three values.

In the submerged-arc furnace, the depth of electrode penetration is of great importance and is not consistently related to any electrical value, such as phase current or electrode-to-shell voltage. The electrode penetration necessary to satisfy a given current requirement is determined by the nature and amounts of various materials in the charge around the electrode. These are: Segregation of conducting and non-conducting parts of the raw material in the furnace charge; formation and escape of veins and pools of molten metal; isolation of the electrode by an encrustation of non-conducting materials resulting from improper amount or distribution of reduction carbon in the charge; and temperature of the furnace. The latter is more pronounced in a ferro-chrome furnace where both the raw material and the slag are very poor conductors except at elevated temperatures.

In the submerged-arc furnace, the electrode-to-shell voltage does not always decrease with an increase of electrode penetration, although the current may increase with penetration. Thus, it may be seen that ordinary regulators relying upon a balance between phase current and phase-to-shell voltage can, under certain conditions, regulate a submerged-arc furnace properly; but, again, under other and equally common furnace conditions fail to regulate the furnace properly. It may permit full electrode current with very little penetration of the charge, or it may permit complete penetration of the charge without achieving desired current, and in both cases it would do nothing about changing furnace voltage to one that would more nearly allow the desired conditions.

The object of the invention is to provide an automatic control for electric-arc furnaces which will maintain the desired current in each phase insofar as possible within predetermined limits of electrode penetration, by moving the electrode deeper into the charge to increase current and by withdrawing the electrode from the charge to decrease the current as needed.

Another object is to provide such an automatic regulator which will require deviations from the control point directly proportionate to the existing penetration of the electrode before the regulator responds by lowering the electrode.

A further object is to provide such an automatic regulator which will require deviation from the control point inversely proportionate to the existing penetration of the electrode before the regulator responds by raising the electrode.

A still further object is to provide such an automatic regulator which, upon encountering furnace conditions that render it impossible to maintain required electrode penetration and electrode current, each within predetermined limits of the other, will raise or lower the transformer voltage as needed to a value more consistent with the required limits of phase current and electrode penetration.

The above objects together with others which will be apparent from the drawing and following description, or which may be later referred to, may be attained by constructing the improved automatic voltage and electrode control in the manner hereinafter described in detail and illustrated in the accompanying drawing, in which;

The figure is a schematic or diagrammatic illustration showing the circuit for one phase only of a three-phase, submerged arc furnace regulator.

The drawing is not intended to illustrate actual positions of the regulator components, nor to portray their actual physical appearance, but only to illustrate the physical and electrical relation of the various parts.

A three-phase power circuit is shown as comprising the phases indicated at 1, 2 and 3, to each of which is connected the usual electrode 4. For the purpose of simplicity, the drawing shows only the circuit and devices of the automatic regulator for the one phase indicated at 1. Each phase is equipped with a current transformer, the transformer for the phase indicated at 1 being shown at 5.

The secondary of this current transformer is connected in series with the current element 6 of a watthour meter indicated generally at 7. One side of the secondary of the transformer 5 is connected by wire 8 to the current element 6 of the watthour meter and the other side of the transformer is connected through wires 9, 24, 25, 11 and 12 to the current element 6 of the watthour meter.

Three parallel circuits are shunt connected to this series combination and are indicated generally at A, B and C. The circuit A includes the variable resistance 13, variable resistance 14 and solenoid coil 15, the variable resistance 13 being connected to the wire 11 by wire 16 and to the variable resistance 14 by wire 17 which is connected to the solenoid coil 15 by wire 18, the solenoid coil being connected to the wire 9 by wire 19.

The shunt circuit B comprises the solenoid coil 20 connected to the wire 11 by wire 21 and to the wire 9 by wire 22.

The circuit C comprises the variable resistance 23 connected to the wire 11 by wire 24 and to the wire 9 by wire 25. This is the load adjustment resistor by means of which the load desired in the phase is set by the operator.

Calibrating resistors 26 and 27 are provided for controlling the effect of the variable resistances 13 and 14 and the sensitivity of solenoid 15, and calibrating resistor 28 is provided for controlling the effect of the variable resistance 23 and the sensitivity of the solenoid 20.

The calibrating resistors 26, 27 and 28 perform the added function of adjusting the total resistance in the secondary of the current transformer 5, thus regulating the voltage across this secondary by raising or lowering the secondary volt-ampere burden of the transformer.

A control relay 29 is connected to a pair of line wires L' and L² by the wires 30 and 31 respectively, the latter being connected to the wire L² through the automatic 32.

The armature 33 of the control relay 29 is connected at its center to a spring 34 attached to a stationary support as at 35. Opposite ends of the armature 33 are connected by springs 36 and 37 to the armatures 38 and 39 respectively of the solenoids 15 and 20.

When the device is on manual, the control relay 29 is not energized and the spring 34 centers the armatures 38 and 39 of the relays 15 and 20 in a neutral position.

When the device is on automatic, the control relay 29 is energized and the spring 36 opposes the action of the solenoid coil 15, while the spring 37 opposes the action of the solenoid coil 20.

The armatures 38 and 39 of the solenoids 15 and 20 have contact arms 40 and 41 connected to their upper ends for alternate contact with the two sets of fixed contact points associated therewith. Wire 42 is connected to the line wire L², through the automatic 32, and is connected to the upper and lower stationary contacts 43 and 44 respectively, adapted to be alternately contacted by the contact arm 40 of the armature.

The contact 43 is one of a spaced pair of stationary contacts, the other being indicated at 43', and in like manner the stationary contact 44' is spaced from the contact 44 and adapted to be contacted by the arm 40 simultaneously with the contact point 44.

A wire 45 leads from the stationary contact 43' to a stationary contact 43a located in a control circuit, similar to that illustrated, for the second phase. The contact 43a is one of a pair, the other contact 43a' thereof being connected by wire 46 to a contact 43b in a similar control circuit for the third phase.

The other contact 43b' of the last-named pair is connected to wire 47 which leads back to the line wire L', through any conventional voltage control or warning device indicated at 48.

In like manner the fixed contact 44' is connected by wire 49 to a fixed contact 44a in the control circuit of the second phase. The other contact 44a' of said pair is connected by wire 50 with the contact 44b in the control circuit of the third phase and the other contact 44b' of the said pair is connected to wire 51 which leads back to the line wire L' through any conventional voltage control or warning device as also indicated at 48.

The electrode for each phase is independently controlled through the operation of the solenoid 20 in the corresponding control circuit for that phase. A spaced pair of fixed controls 52 and 52' are located above the contact arm 41 of the armature 39 and adapted to be simultaneously contacted, and a similar pair of stationary contacts 53 and 53' are located below the arm 41 and adapted to be simultaneously contacted thereby.

The contact point 53' is connected by wire 54 to the line wire L², through the automatic 55, and the contact point 52' is connected to the wire 54 by the wire 56. The contact point 52 is shown connected to the wire 58. The contact point 53 is shown connected to wire 57. Wires 57 and 58 lead back to the line wire L' through any conventional electrode control apparatus as indicated at 59.

In the operation of the device on automatic, when the solenoid 15 overcomes the spring 36 the armature 38 of said solenoid is moved upward making contact between the points 43 and 43' lowering the voltage on the furnace transformer one tap, or operating an annunciator device which warns the operator, providing the corresponding contacts 43a—43a' and 43b—43b', in the other two phases, are simultaneously closed.

When the spring 36 overcomes the coil 15 the armature 38 is lowered, closing the contacts 44 and 44' and raising the voltage of the transformer one tap or operating the annunciator device, providing that the corresponding contacts 44a—44a' and 44b—44b', of the other two phases are simultaneously closed.

Similarly, when the coil 20 overcomes the spring 37, armature 39 will raise, closing the contacts 52—52' to lower the electrode of that phase. This action is independent of the position of similar contacts in the other two phases. In like manner, when the spring 37 overcomes the coil 20, the armature 39 will be lowered, closing the contacts 53—53' and lowering the electrode for that phase, independently of the electrodes in the other two phases.

The springs 34, 36 and 37 are adjustable and the solenoids 15 and 20 are dashpot dampened. While shown as solenoid-type relays the coils 15 and 20 may be in the form of rotating disc, induction type relays if desired.

The current flowing in the secondary of the current transformer 5 is directly related to the current in that phase of the furnace, and the secondary current of the transformer divides among the circuits A, B and C as described above.

The part of the secondary current that flows in each of these circuits is inversely related to the resistance and inductive reactance of that circuit. Thus, it will be seen that reducing the resistance of one circuit will cause a greater portion of the secondary current to flow in that circuit, and a proportionately lesser portion of the secondary current to flow in the other two of the three parallel circuits A, B and C.

The load adjusting resistor 23 can be adjusted by the operator to provide either a high resistance path or a low resistance path for the secondary current of the transformer 5, and in this way the operator can adjust the amount of secondary current flowing in circuits A and B.

The operator can thus adjust the amount of current that must flow in the secondary of the transformer, and in that phase of the furnace, to cause a balance between the coil 15 and spring 36, also a balance between the coil 20 and spring 37, so that neither electrode hoisting or lowering action, nor transformer voltage change will result.

For the purpose of this description, once the effect of the variable resistance 23 has been determined, its action in the circuit can be ignored and consideration given only to the relation of circuit A and circuit B, and to the manner in which that portion of the secondary current of the transformer 5, not taken by circuit C affects the relays in the circuits A and B.

When the regulator is in operation, if there is insufficient current flowing in circuit B for the coil 20 to overcome the spring 37, the electrode lowering contacts 53—53' will close, causing the electrode positioning mechanism to lower the electrode for that phase until there is enough current from the transformer 5 to allow the coil 20 to overcome the spring 37 and stop such action.

Conversely, when there is more than enough current flowing in circuit B for the coil 20 to overcome the spring 37, the electrode hoisting contacts 52—52' will be closed, causing the electrode positioning mechanism to raise the electrode of that phase until the current in the phase diminishes enough for a balance between the coil 20 and spring 37 to be reached, stopping such action.

Solenoid 20 thus regulates the current in the phase by raising and lowering the electrode in a manner common to other automatic regulators. This action, however, is itself regulated by the amount of transformer current being taken by circuit A, which includes the resistors 26 and 27 in series as well as the coil 15 which is also in series therewith.

The purpose of circuit A is to so regulate the values of current acting on circuit B that greater and greater increases in the secondary current are necessary to cause hoisting action as the electrode approaches the top of the charge, and greater and greater decreases in secondary current are necessary to cause lowering action as the electrode penetrates deeper and deeper into the charge.

Briefly, the function of circuit A is to attenuate the sensitivity of circuit B in such a manner that when the electrode is deep the regulator will respond more readily to increases in phase current and less readily to decreases in phase current. Also, that when the electrode is high the regulator will respond more readily to decreases in phase current and less readily to increases in phase current.

In order to do this, it is necessary for the actual position of the end of the electrode to be translated into an electrical value that can so influence circuit B. Circuit A does this, and at the same time changes the current values in the coil 15, in such a manner that the solenoid 15 and similar solenoids of the other two phases, act together to raise the transformer voltage when all electrodes are long and/or low and the current in all phases is below normal, and act together to lower the transformer voltage when all electrodes are short and/or high and the current in all phases is above normal.

This is accomplished as follows; the actual position of the end of the electrode is translated to an electrical value (in this case resistance, although other values, namely inductance or variable transformer ratios could be used) which varies with the position of the end of the electrode.

Two factors determine the position of the end of the electrode, one being the length of the electrode below the clamp that holds the electrode and the other being the position of the clamp itself. In this regulator device, the position of the clamp is used to determined the value of the resistor 13, which has its moving contact mechanically linked as indicated at 13a to the electrode hoisting mechanism indicated at H in such manner that when the hoisting mechanism is at the top of its travel the resistor 13 is at its least ohmic value and when the hoisting mechanism is at the bottom of its travel the resistor 13 is at its greatest ohmic value.

In this regulator, the length of the electrode below the clamp is, at the beginning of the furnace operation and at each time a visual inspection can be made, made to coincide with the setting of the resistor 14.

The resistor 14 is provided with a calibrated scale so that its moving contact can be set to correspond to any length of electrode below the pad that would be encountered in normal furnace practice. For example, if the normal amount of electrode below the clamp always is within the limits of 1 to 4 feet, the calibrated dial of resistor 14 would be marked in suitable divisions of from 1 to 4 feet.

When visual inspection is possible, the pointer is set to the position corresponding to actual electrode length. Resistor 14 is coupled to the single-phase watthour meter 7 by a gear train and friction clutch F that can be slipped when the pointer and moving contact of resistor 14 is being moved manually.

The watthour meter 7 is driven by a current component related to the current flowing to the corresponding electrode, and by a voltage component which is the voltage—or a proportionate part thereof—between the electrode and the furnace shell.

The direction of rotation of the watthour meter 7 is such that with the consumption of electric energy in the phase, resistor 14 changes from its maximum to its minimum ohmic value. The watthour meter 7 actually measures the consumption of energy in the phase it helps regulate, and with the proper gear train in its attachment to the moving contact of resistor 14 constantly adjusts the value of resistor 14 to a value closely related to the length of the electrode, because the electrode is consumed and shortened by an amount directly related to the actual kilowatt hours of energy it delivers to the furnace charge.

This relationship between energy and electrode consumption is consistent and varies only when there is greater than normal or less than normal reduction carbon in the raw material of the charge close to the electrode.

A lack of carbon in the charge around an electrode causes that electrode to be consumed more rapidly by a given amount of power, and a surplus of carbon around an electrode will cause the same to be consumed less rapidly by a given amount of power.

With a surplus of carbon, the voltage from electrode to shell will almost exactly equal the voltage from electrode to charge, so that the speed of the watthour meter 7 and the resultant integration of resistance value in resistor 14 will remain related not only to normal electrode consumption but to abnormal consumption resulting from the most frequent cause of electrode isolation, which is the only form of electrode isolation that results in less than normal or greater than normal ratio of electrode consumed to energy delivered to the charge.

Whenever the electrode is lengthened below its clamp, the operator adjusts resistor 14 a like amount, and this resistor will thus have an ohmic value closly related to the length of the electrode below the clamp.

When the electrode length is maximum, the resistance of resistor 14 will be maximum, and when the depth of the electrode is maximum the resistance of resistor 13 will be maximum. Since resistors 13 and 14 are in series, circuit A will take less than normal current away from circuit B when the electrode is deep in the charge, and more than normal current away from circuit B when the electrode is shallow in the charge.

Thus, the electrode lowering effect on solenoid 20 is diminished when the electrode is already deep, and the electrode hoisting effect thereon is diminished when the electrode is high in the charge.

Greater than balance current in solenoid coils 15, of all phases, simultaneously, results in a decrease in transformer voltage, while less than balance current in the solenoid coils 15 of all phases simultaneously results in an increase in transformer voltage.

It will thus be seen that high and/or short electrode combined with current surges greater than those the regulator is adjusted to balance at will, cause a decrease in transformer voltage, while deep and/or long electrodes combined with current decreases greater than the regulator is set to balance at will results in an increase in transformer voltage.

It is thus apparent that the regulator adjusts electrode position in relation to phase current and electrode penetration, and it adjusts transformer voltage in relation to electrode penetration and phase current for a simultaneous condition in all phases.

The regulator automatically makes each of these values a direct or inverse function of each of the others as the case need be. It combines, to a very great degree, the many variables encountered in the regulation of submerged-arc furnaces, and regulates the furnace to the optimum compromise of these values from instant to instant.

The regulator will automatically lower an electrode that is falling off in current but, the deeper the electrode goes into the charge the less pronounced will be the lowering response of the regulator to further decreases in current.

Electrode lowering response is gradually changed to voltage increase response, and if the same trend prevails in the other phases, voltage will be raised on the secondary of the transformer supplying the furnace.

On the other hand, if an electrode is picking up on current the regulator will raise that electrode. The higher the electrode goes the greater the surges of current necessary to drive it higher. The electrode raising response becomes less pronounced and the voltage lowering response becomes more pronounced. If the same trend prevails in the other phases of the furnace, the furnace voltage will be lowered. The regulator takes exactly the same action that must be taken by human supervision when the same conditions are encountered in furnace operation.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. A variable-value resistor, physically linked to an electrode positioning mechanism so as to introduce a variable into the regulation circuits that changes the response of said regulation circuits in an amount related to the position of the electrode positioning mechanism.

2. A variable-value resistor, physically linked to an energy integrating device, permitting the motion imparted to said energy integrating device by the electric energy in the circuit to which the device is connected to change the electrical characteristics of the resistor, so physically linked to the said energy integrating device; introducing a variable into the regulation circuits; such variable being integrated to the rate of energy consumption in the power circuit being regulated; and by reason of such integration, changing the response of the regulator in an amount related to the energy consumed in the power circuit being regulated, during the period of such integration.

3. An automatic electrode control for electric-arc furnaces including regulation circuits, a variable-value device physically linked to an electrode positioning mechanism so as to introduce a variable into the regulation circuits to change the response of said regulation circuits in an amount related to the position of the electrode positioning mechanism.

4. An automatic electrode control for a three-phase electric-arc furnace including a current transformer in each phase, a watthour meter connected in series with the secondary of each current transformer, three parallel circuits shunt connected to said series combination, a load adjustment variable resistor in one of said circuits physically linked to the watthour meter and to the electrode positioning mechanism, an electrode raising and lowering relay in another of said circuits and a voltage raising and lowering relay in the other of said circuits.

5. An automatic electrode control for a three-phase electric-arc furnace including a current transformer in each phase, a watthour meter connected in series with the secondary of each current transformer, three parallel circuits shunt connected to said series combination, a load adjustment variable resistor in one of said circuits physically linked to the watthour meter and to the electrode positioning mechanism, an electrode raising and lowering relay in another of said circuits and a voltage raising and lowering relay in the other of said circuits, and means operated by the simultaneous operation of the voltage raising and lowering relays in all phases for regulating the transformer voltage.

6. An automatic electrode control for a three-phase electric-arc furnace including a current transformer in each phase, a circuit connected to the secondary of each current transformer, means in each circuit for independently controlling the raising and lowering of the electrode for that phase so that the amount of raising or lowering of the electrode is in turn controlled by the position of the electrode at the time of regulation, and means in each circuit cooperating with similar means in the other circuits for simultaneously regulating the transformer voltage in all three phases.

7. An automatic electrode control for a three-phase electric-arc furnace including a current transformer in each phase, a circuit connected to the secondary of each current transformer, a load adjustment variable resistor in each circuit physically linked to the electrode positioning mechanism, means in each circuit for independently controlling the raising and lowering of the electrode for that phase so that the amount of raising or lowering of the electrode is in turn controlled by the position of the electrode at the time of regulation, and means in each circuit cooperating with similar means in the other circuits for simultaneously regulating the transformer voltage in all three phases.

8. An automatic electrode control for a three-phase electric-arc furnace including a current transformer in each phase, a circuit connected to the secondary of each current transformer, a shunt connected load adjustment variable resistor in each circuit means physically linking the variable resistor with the electrode positioning mechanism, shunt connected means in each circuit for independently controlling the raising and lowering of the electrode for that phase so that the amount of raising or lowering of the electrode is in turn controlled by the position of the electrode at the time of regulation, and shunt connected means in each circuit cooperating with similar means in the other circuit for simultaneously regulating the transformer voltage in all three phases.

References Cited in the file of this patent

UNITED STATES PATENTS

| | | |
|---|---|---|
| 2,335,399 | Efraimovitch | Nov. 30, 1943 |
| 2,399,351 | Houck et al. | Apr. 30, 1946 |
| 2,419,988 | Davis | May 6, 1947 |
| 2,423,190 | Kennedy | July 1, 1947 |